Nov. 20, 1934.  H. HUEBER ET AL  1,981,840
FLUID MOTOR
Filed Nov. 28, 1930  3 Sheets-Sheet 1
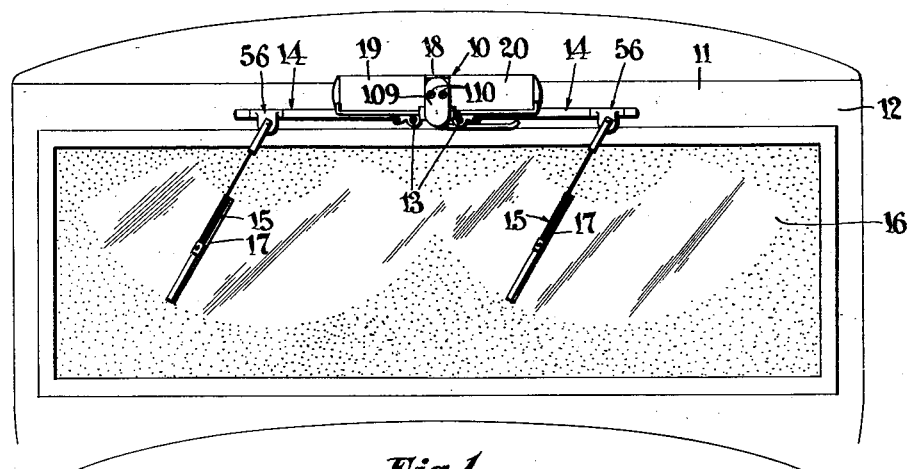
Fig. 1
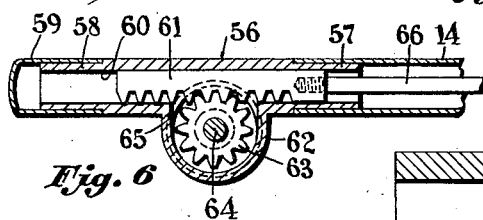
Fig. 6
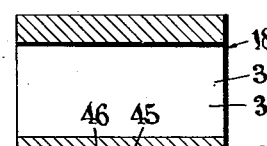
Fig. 5
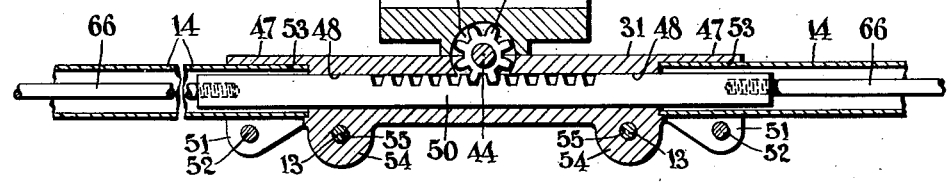
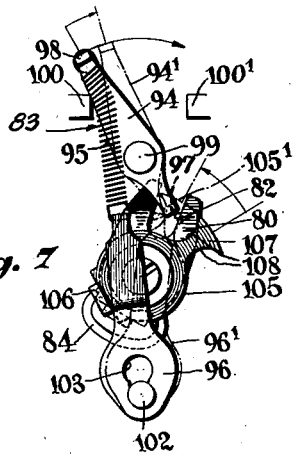
Fig. 7
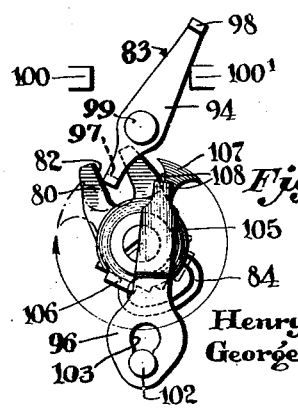
Fig. 8
Inventors
Henry Hueber
George Dykstra
By Barton A. Bean Jr.
Attorney Nov. 20, 1934.   H. HUEBER ET AL   1,981,840
FLUID MOTOR
Filed Nov. 28, 1930   3 Sheets-Sheet 2
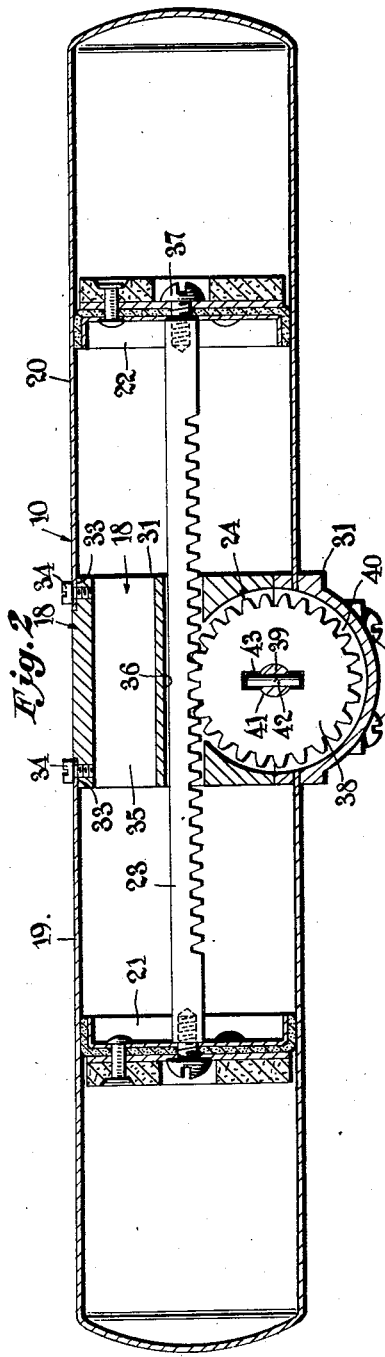
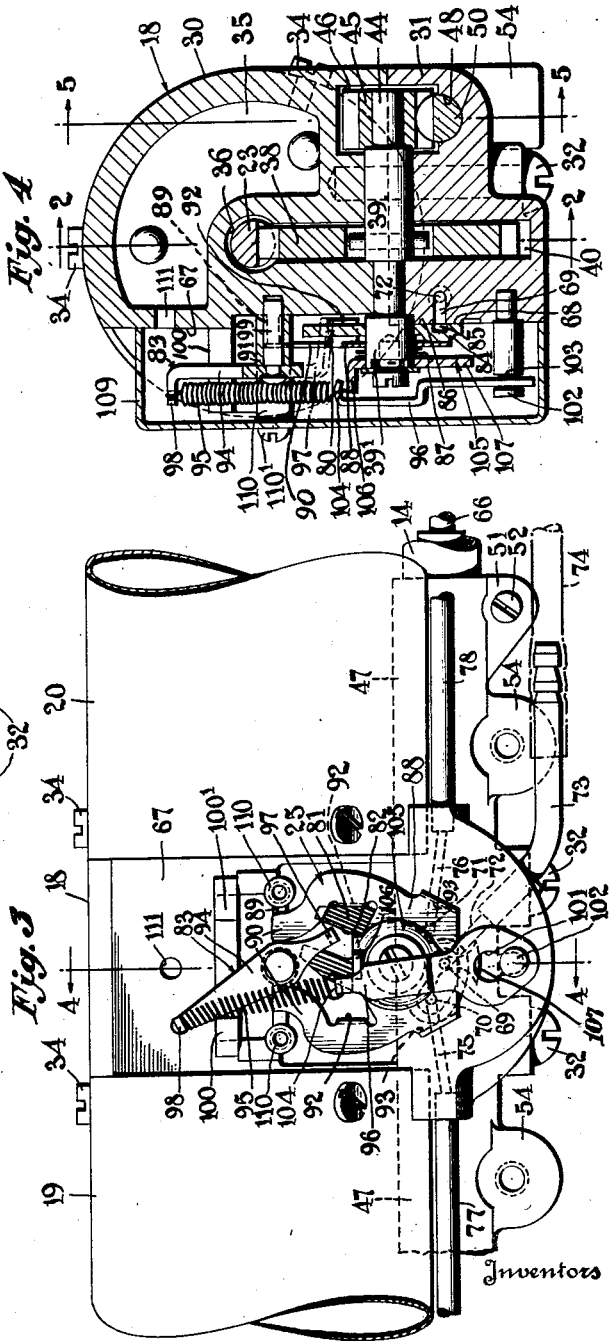
Inventors
Henry Hueber
George Dykstra
By
Barton A. Bean Jr. Attorney

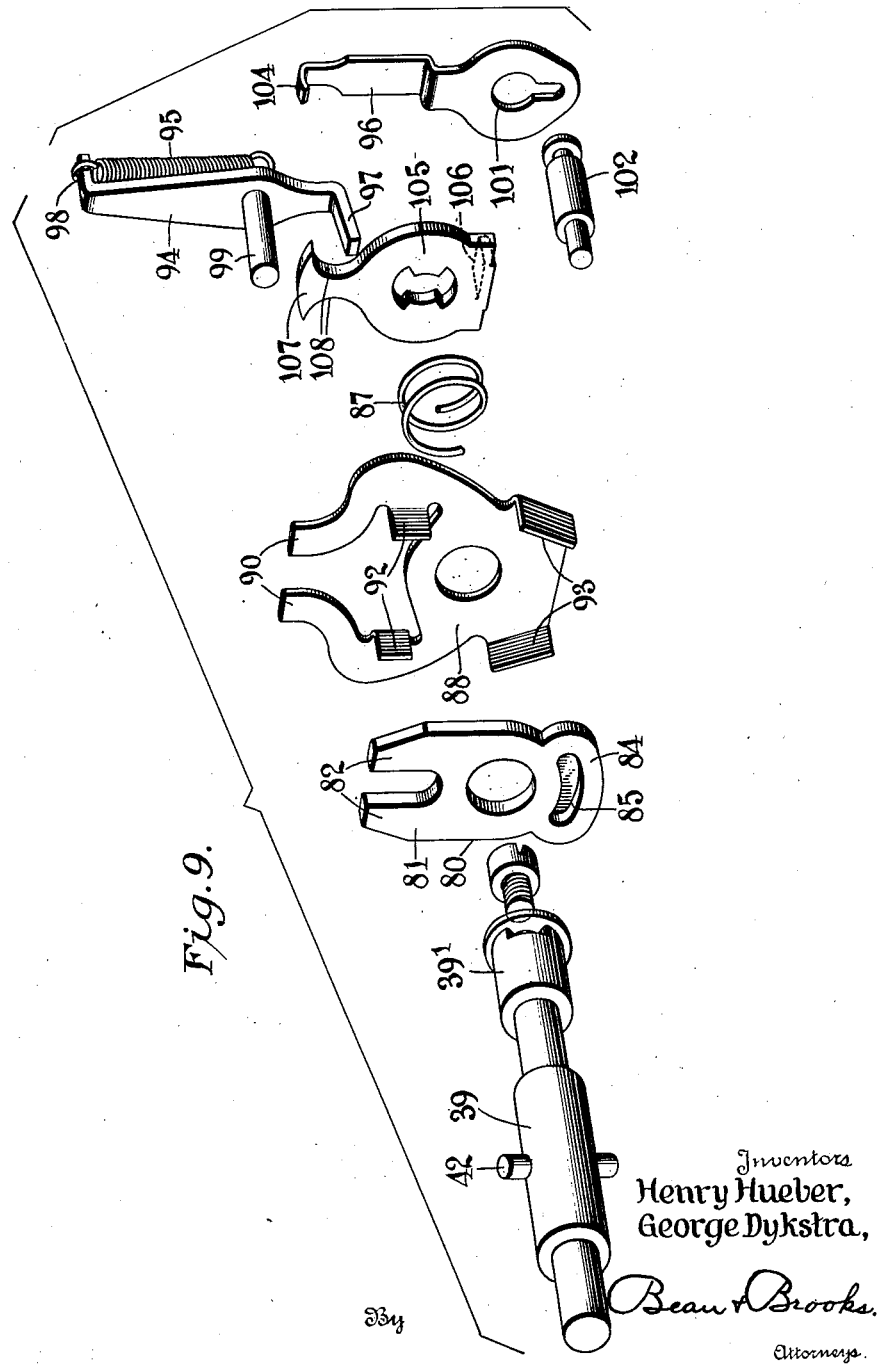

Patented Nov. 20, 1934

1,981,840

UNITED STATES PATENT OFFICE 1,981,840

FLUID MOTOR

Henry Hueber and George Dykstra, Buffalo, N. Y., assignors to Trico Products Corporation, Buffalo, N. Y.

Application November 28, 1930, Serial No. 498,850

8 Claims. (Cl. 121—164)

This invention relates to windshield cleaners of the automatic or power operated type and particularly to that class of cleaners having a plurality of wipers adapted for simultaneous operation. More particularly the invention relates to the actuating mechanism for shifting the application of power in effecting the desired reciprocatory motion of the windshield cleaner motor.

At present it is customary to mount one or more of the wipers adjacent to the windshield of a motor vehicle for cleaning rain, mist, snow and the like from a portion of the windshield surface. When a plurality of such blades are utilized it is usual to connect them for actuation with a single motor, which may be of the suction or pressure type, thereby placing an additional burden on the motor.

This invention has for its object to provide a motor with a greater power, or one especially designed for heavy duty. Further, the object of the invention is to provide an improved valve construction and action which will permit greater piston movement before reversing the application of power so that the enlarged movement may be geared down in a manner to insure a powerful wiping stroke.

This invention is embodied in a windshield cleaning device that includes a plurality of wipers with drive means therefor, an actuating motor, and an improved valve mechanism for the motor, all housed in a unitary structure which may be readily mounted on the header bar above the windshield of the vehicle.

The device holds the cooperating wipers in such a relation, that in operation they may clean a substantial portion of the windshield surface, the surface cleaned by each wiper preferably overlapping that cleaned by the adjacent wiper in order that an uninterrupted area of visibility extending substantially across the windshield will be cleaned at each stroke of the wipers. While the device may be used on many types of motor cars, it is particularly intended for use on large vehicles such as busses and trucks, where, because of the difficulty of operation it is desirable to maintain a greater area of visibility than in smaller and more easily controlled passenger cars.

The foregoing and various other objects and aspects of the invention will become apparent from a perusal of the following description thereof, wherein reference is made to the accompanying drawings, in which:

Fig. 1 is an elevational view of the device mounted on a motor vehicle.

Fig. 2 is a vertical longitudinal cross-sectional view taken substantially on line 2—2 of Fig. 4.

Fig. 3 is a partial elevational view of the improved valve actuating mechanism enlarged to show the details thereof.

Fig. 4 is a vertical cross-sectional view taken substantially on line 4—4 of Fig. 3.

Fig. 5 is a vertical cross-sectional view of the central rack and pinion taken on line 5—5 of Fig. 4.

Fig. 6 is a vertical cross-sectional view of the outer end of one of the supporting arms.

Fig. 7 is an elevational view showing in detail the valve actuator and kicker members in positions immediately preceding the actuation of the kicker members in one direction.

Fig. 8 is an elevational view showing the relative positions of the valve, the valve actuator and kicker members immediately after the kicker members have been actuated in the direction referred to in the description of Fig. 7.

Fig. 9 is an exploded perspective of fluid control members for a fluid motor.

As shown in Fig. 1 the motor 10 is secured to the header bar 11 of a motor vehicle 12 by screws 13. A pair of tubes 14 are so extended from the motor 10 that the wipers 15 carried thereby lie adjacent the surface of the windshield 16 with the blades 17 of the wipers 15 in contact with the windshield. Contact of the blades with the windshield is maintained in a well known manner by springs (not shown).

The motor 10 consists of a central body 18 interposed between a pair of opposed cylinders 19 and 20, a pair of opposed pistons 21 and 22 reciprocally mounted in the cylinders and connected by a rack bar 23, a drive mechanism 24 meshing with the rack bar 23 for operating the wipers 15, and a valve mechanism 25 operably connected to the drive mechanism for alternately putting the opposed cylinders in communication with a source of power, all of which will be hereinafter described in detail.

The body 18 is formed of an upper casting 30 and a lower casting 31 rigidly connected to each other by screws 32 and when so assembled the cylinders 19 and 20 are pressed onto circular reduced terminal portions 33 of the body and maintained in intimate relation therewith by screws 34. The upper casting is formed with a longitudinal passage 35, and with a central bore 36, both of which communicate with both cylinders 19 and 20, (see Figs. 2 and 4). The rack bar 23 is reciprocally mounted in the bore 36 and has the pistons 21 and 22 of the cupped leather type connected to its ends by screws 37, (see Fig. 2).

The drive mechanism 24 consists of a comparatively large gear 38 mounted on a transverse shaft 39 in a substantially circular vertical slot 40, which communicates with the bore 36 so that the teeth of said gear mesh with the depending teeth of the rack bar 23, and is driven by the latter. The gear 38 is provided with a central bore 41 of a size to receive the shaft 39 which is transversely journalled between the upper and lower castings 30 and 31 centrally thereof. A pin 42 passes transversely through the shaft 39 and has its ends extended into slots 43 formed radially of the bore 41. A reduced portion 44 is formed on the rear end of the shaft 39 to receive a relatively small gear 45 which operates in an opening 46 formed in the upper and lower castings as best shown in Figs. 4 and 5.

The lower casting 31 and a pair of aligned extensions 47 formed thereon have a common central longitudinal bore 48 in which a rack bar 50 is mounted for reciprocatory movement in a plane parallel to the axis of the rack bar 23. The transverse and vertical location of the bore 48 is such that the teeth of the rack bar 50 engage the teeth of the gear 45 and are driven thereby during operation of the device. Each terminal of the extensions 47 is formed with a pair of spaced depending lugs 51, adapted to receive a clamping screw 52, and a counter-bore 53 in which the inner end of one of the tubes 14 is rigidly secured by tightening the respective clamping screw 52, (see Fig. 5). A pair of depending lugs 54 formed on the extensions 47 inwardly of the lugs 51 are provided with central transverse bores 55 to receive the screws 13 by means of which the device is attached to the header bar 11.

By reference to Fig. 1 and more particularly to Fig. 6 it will be seen that the outer ends of the tubes 14 are provided with castings 56, having reduced terminal portions 57 and 58, the former being fitted in the ends of the tubes 14, while the latter are fitted with caps 59. Each casting 56 is formed with a longitudinal central bore 60 in which a rack bar 61 is mounted for reciprocation, and a central depending housing portion 62 in which a gear 63 is rotatably mounted upon a transverse shaft 64. Said shaft is journalled in the housing 62 and a rear removable housing plate 65 (Figure 6) and adapted to receive one of the wipers 15. The opposed ends of the rack bars 50 and 61 are tapped and threaded to receive the threaded ends of the connecting rods 66.

It is to be understood that the rack bars 50 and 61 are at all positions, within the limits of their reciprocatory movements, supported and guided in their respective bores, and that slight variations in alignment of the bores will be compensated for by the flexibility of the rods 66, thereby eliminating any possible binding of the aforesaid parts in operation.

The lower casting 31 is slightly off-set to provide a valve seat 68 which is formed with a central supply port 69, and a pair of cylinder ports 70 and 71 spaced therefrom but at opposite sides thereof. The axes of the ports 69, 70 and 71 are arranged on a common arc that is concentric with the axis of the shaft 39 which is extended beyond the vented wall 67 for a purpose to be presently described. The port 69 opens into an angular port 72 which is counter-bored to receive a small tube 73, the outer end of which has secured thereon a tube 74, said tube 74 being connected to a control valve, not shown, and to a source of reduced pressure, such as the intake manifold of the vehicle engine.

The ports 70 and 71 open into angular ports 75 and 76 respectively, said ports being counter-bored to receive the respective tubes 77 and 78 which extend outwardly from the body, subjacent and substantially parallel to the cylinders 19 and 20. An angular end formed on the tube 77 passes through the end wall of cylinder 19 and is secured therein in any suitable manner, while the tube 78 is similarly formed and secured in the end wall of the cylinder 20.

The valve mechanism 25, best shown in Figs. 3, 4, 7 and 8, located adjacent the wall 67.

The shaft 39 extending beyond the wall 67 as at 39' provides a loose mounting for an oscillating valve-plate 80, having an upper portion 81 slotted as at 82 for engagement with a kicker mechanism 83 from which the valve plate receives its oscillatory movement, and a lower portion 84 formed with a shallow arcuate recess 85 in its inner face 86. When the valve-plate 80 is in the position shown in Figs. 3 and 7, the recess 85 bridges the ports 69 and 70 so that the cylinder 19 by means of ports 75 and tube 77 is in communication with the source of reduced pressure and the port 71 is open to the atmosphere. Said inner face 86 of the lower portion 84 is maintained in sliding contact with the valve seat 68 by a spring 87 acting upon a yoke-shaped pressure plate 88 which is loosely mounted on the shaft 39 and given further support by a transverse rib 89 formed on the wall 67.

The plate 88 is formed with arms 90 which straddle a boss 91 formed centrally of the rib 89 and with opposed pairs of upper inturned lugs 92 and lower inturned lugs 93 which lie in the path of valve-plate 80, limiting its oscillatory movement and tending to cushion the snap-action of said valve-plate therebetween. It will be observed that the diameter of the boss 91 is slightly less than the distance between the adjacent end portions of the arms 90, and thus the pressure plate 88 is prevented from rotating.

The kicker-mechanism 83 of the valve-mechanism comprises lever 94, a tension spring 95 and an offset arm 96. The lever 94 is formed with a lower inturned finger 97 of a relatively narrow transverse dimension as compared to the width of slot 82 into which it extends to thereby provide a play connection with the valve-plate 80 for a purpose to be hereinafter described. An out-turned ear or spring anchor 98 is formed on the upper end thereof. Intermediate the ends of lever 94 is a pivot pin 99 which is journalled in the boss 91 for oscillatory movement thereabout. Said movement of the lever 94 is determined by the spring 95 coming into contact with either of the lugs 100 and 100' which extend from the face of wall 67 into the path of the spring (see Figs. 3 and 4).

A keyslot 101 formed in the lower end of arm 96 is detachably engaged in a circular groove 103 of a pin 102, anchored in the wall 68. The tension spring 95 is connected to an ear 104 on the upper end of arm 96 and to the ear 98 of arm 94, so that the normal tension in the spring causes the arms 94 and 96 to assume either of the positions shown in Figs. 7 and 8. In oscillating from the position shown in Fig. 7 to that shown in Fig. 8, and vice versa, the arm 94 engages the valve-plate 80 and shifts the same back and forth.

The valve mechanism further comprises a substantially circular actuator-plate 105 keyed or connected to the extended end 39' of shaft 39 for movement therewith. Engagement of the actuator-plate 105 with the kicker-mechanism is a two-phase engagement being had as by an out-turned lug 106 which pre-sets the kicker-mechanism and a lug 107 which fully sets the kicker-mechanism and causes the final movement thereof.

Referring to Figs. 3, 7 and 8 the lugs 106 and 107 are shown as extended from the actuator-plate into the paths of the lower portion of the arm 96 and the finger 97 of arm 94, respectively. As the actuator-plate 105 moves from the full line position in a counter-clockwise direction towards the broken line position 105' shown in Fig. 7 the pre-setting of the kicker-mechanism is accomplished by the primary lug 106 engaging the lower end of the arm 96 and moving it towards the broken line position 96'. Continued movement of the actuator after the pre-setting has taken place causes the secondary lug 107 to engage the finger 97 of arm 94 and move said arm through its idle movement to the broken line position 94' (same figure) at which time arm 96 has reached position 96', the kicker mechanism is fully set and the finger 97 is in operable engagement with the valve-plate 80. With the parts 105, 96 and 94 in the broken line positions 105', 96' and 94' respectively and the tension in spring 95 slightly increased due to the movement of said parts, the actuator continues its movement until the lug 107 forces the arm 94 beyond its dead center with respect to the spring 95. Then this spring causes the kicker-mechanism and valve-plate to snap into the positions shown in Fig. 8. The curved shape of the secondary lug 107 is such that the cam faces 108 thereof engage the finger 97 and increase the angular velocity of the arm 94 during its final movement which results in a faster snap-action with no increase in the angular velocity of the actuator. As the cam surface 108 contacts the lug 97, movement of the lever 94 in a clock-wise direction (Fig. 7) begins very slowly because curve defining the cam surface at the point of initial contact moves almost radially with respect to the axis of rotation of the lug 97, i. e., of the pin 99. At the instant the lug 97 has been actuated to the position wherein it contacts the arm 82 of the valve plate, its rate of movement, as well as the movement of the lug 97, is being rapidly increased by the change in position along the curved contour of the cam surface 108 and the spring 95 is then passing the dead center with respect to the axis of the pin 99 to conclude the snap action in actuating the valve plate 80. Thus a smooth operation of the elements is insured, because the spring 95 is not violently or suddenly flexed in its initial movement, but its rate of tensioning is accelerated progressively from a zero value until the snap action has been initiated.

During the final movement of the kicker-mechanism, the idle movement of finger 97 in slot 82 permits the pistons to nearly complete their strokes which are completed at the time the valve-plate is snapped by the kicker-mechanism into the position shown in Fig. 8. And when the valve-plate 80 is in the position referred to port 70 is open to the atmosphere, recess 85 bridges the ports 69 and 71 establishing communication between cylinder 20 and the source of reduced pressure, by means of port 76 and tube 78 and operation of the device is reversed. The entire valve-mechanism is encased by a cover or housing 109 and secured upon bosses 110 by screws 110'. The fit of the housing with the vented wall 67 is such that air may enter said housing to supply the ports 70 and 71 when uncovered by the valve-plate 80.

The wall 67, above the valve-mechanism 25, is provided with a port 111 which communicates with the passage 35 and the housing 109. Air entering passage 35 through the port 111 at substantially normal atmospheric pressure acts upon the inner faces of the pistons during the time they are being operated by alternately reducing the atmospheric pressure in the ends of the cylinders 19 and 20 in the manner described. It is to be understood that air at atmospheric pressure is always present in the passage 35 and in the ends of the pistons adjacent thereto.

The operation of the device is as follows:

With the pistons in the positions shown in Fig. 2 and the valve-mechanism in the position shown in Fig. 3 the recess 85 of the valve-plate 80 bridges the ports 69 and 70 so that when a control valve (not shown) is opened, communication between the source of reduced pressure and the outer end of piston 19 is established through tubes 74, 73, port 72, said ports 69 and 70, port 75 and tube 77. The reduced pressure now in cylinder 19 causes the pistons 21 and 22 to move to the left, as viewed in Fig. 2, this movement being aided by atmospheric pressure in cylinder 20 back of the piston 22. Air at atmospheric pressure is admitted to the outer end of cylinder 20 through the ports 71, 76 and tube 78. This movement of pistons 21 and 22 to the left is transmitted to the large gear 38 by the rack bar 23 and to the small gear 45 by the rock shaft 39, thereby causing a counter-clockwise movement of the aforesaid parts, and a clockwise movement of gears 63 and wipers 15 by means of the rack bar 50, rods 66 and rack bars 61. Being especially designed for heavy duty, the stroke of the pistons is unusually long and is converted by the reduction gearing into a powerful stroke of the wipers which otherwise have a normal operation. During the aforesaid movements and before the pistons have completed their stroke, the kicker-mechanism has been actuated to the position shown by Fig. 7 wherein the pre-setting operation is begun by primary lug 106. Then the kicker mechanism is fully set by the combined action of primary lug 106 and secondary lug 107 so that as the pistons complete their strokes the actuator causes the kicker-mechanism and valve-plate to snap over to the position shown in Fig. 8 in which position the recess 85 of valve-plate 80 bridges the ports 69 and 71, and exposes port 70, whereby the operation of the device is reversed.

What is claimed is:

1. A motor comprising a supporting structure having drive means, a valve member oscillatably mounted on the drive means, a member for limiting movement of the valve member, a movable kicker mechanism for operating the valve member, and a rotatable actuator driven by the drive means for operating the kicker mechanism, said actuator having a lug normally spaced from and movable into contact with the kicker mechanism to actuate the latter into a primary position, said actuator having a second lug normally spaced from and movable into contact with mechanism to actuate the latter into a secondary position from which it snaps to a final position.

2. A motor comprising a supporting structure having drive means, a valve seat on said structure, a valve member mounted for movement on the seat, a member mounted on said structure for limiting movement of the valve member on the seat and maintaining the valve member on the seat, a multiple part kicker mechanism for shifting the valve member, and an actuator for imparting a two phase movement to said kicker mechanism, said actuator having a primary lug, normally spaced from and movable into contact with one part of the kicker mechanism, to actuate the latter into a primary position, said actuator having a secondary lug, normally spaced from and movable into contact with another part of said mechanism to actuate the latter into a secondary position from which it snaps into a final position.

3. A motor comprising a supporting structure having drive means, a valve seat on the structure, a valve plate mounted for movement on the seat, a member for maintaining the valve plate on the seat, means for resiliently urging said valve plate against the valve seat, said member having means for limiting the movement of the valve plate on said seat, a spring actuated kicker mechanism for shifting the valve member into alternate operative positions on the seat, and an actuator connected to said drive means, said actuator having a primary lug normally spaced from and movable into contact with the kicker mechanism to actuate the latter into a primary position, said actuator having a secondary lug normally spaced from and movable into contact with said mechanism to actuate the latter into a secondary position from which it snaps into a final position.

4. A valve mechanism for motors comprising a supporting structure, a valve seat formed with a plurality of spaced ports on said supporting structure, a rock shaft journalled in the supporting structure adjacent the ports, a valve member mounted on the rock shaft for oscillating movement thereabout, kicker mechanism for moving the valve member by substantially a snap action from one to the other of two operative positions, a spring in the kicker mechanism for influencing its operation, a pressure and limiting plate cooperating with the supporting structure for evenly distributing pressure of said plate against said valve seat, said plate having means for limiting movement of the valve on said seat, and an actuator carried by the rock shaft provided with a primary lug normally spaced from and movable in one direction of rotation into pre-setting contact with the kicker mechanism and a secondary lug normally spaced from and movable in the same direction of rotation into actuating contact with the kicker mechanism to a position wherein snap action thereof is initiated.

5. A valve mechanism for fluid motors comprising a rotatably driven actuator having driving connection with the motor and supported thereby, a movably mounted kicker having a contact part, means spaced from the driving connection for supporting the kicker, said actuator having a lug with oppositely facing and inwardly extending concave edges, said lug moving in an arcuate path across the path of said kicker, one concave edge engaging said contact part at one side thereof during rotation of the actuator in one direction to shift the kicker in one direction and said kicker riding on such edge during such engagement to vary the effective leverage of said actuator on the kicker and thereby vary the relative rate of movement of the kicker and actuator, and the companion edge engaging the opposite side of said part upon reverse movement of the actuator to shift the kicker in the opposite direction and thereby provide a like relative rate of movement, the extent of movement of the actuator lug being greater than 180 degrees in each direction.

6. In a fluid operated device, a support, a shiftable valve, a kicker lever having operative connection to said valve, a movable member having a resilient portion and an offset portion, said member being anchored at one extremity to the support and connected at its opposite end to the lever, an oscillatory actuator movable in a plane parallel to the movement of the said member and having a pre-setting lug projecting into the plane of movement of said member, said lug having a path of movement through the offset portion and on opposite sides of said member, the full oscillatory stroke of the lug describing substantially an arc of 360 degrees, and means cooperable with said lug during the final portion of each operative movement thereof for actuating the kicker lever.

7. In a fluid operated device, a shiftable valve, a kicker lever operably connected to said valve, a spring connected at one end to the lever and movable back and forth across the pivotal axis thereof for actuating the same to shift the valve alternately between two operative positions, a pivoted anchor member connected to the opposite end of the spring, means for pivotally supporting said anchor member, an actuator mounted to oscillate in a plane substantially parallel to the movement of the anchor member, means for supporting said actuator, said actuator having a spring pre-setting lug movable into contact with said anchor member and a lever actuating lug for movement into actuating contact with the lever, said lugs movable idly across the plane including the pivotal connections of said lever and actuator during intervals intermediate their position of contact with the anchor member and kicker lever, respectively.

8. In a fluid operated device, a shiftable valve, a kicker lever operably connected to said valve, a spring connected at one end to the lever and movable back and forth across the pivotal axis thereof for actuating the same to shift the valve alternately between two operative positions, a pivoted anchor member to which the opposite end of the spring is connected, an actuator mounted to oscillate in a plane substantially parallel to the movement of the anchor member, said actuator having a spring pre-setting lug and a lever actuating lug for actuating contact with the anchor member and kicker member, respectively, said lugs movable idly across the plane including the pivotal axes of said lever and actuator during intervals intermediate their operative contact with the anchor member and kicker lever, said lever actuating lug engaging the lever before contact of the spring pre-setting lug with said anchor member.

HENRY HUEBER.
GEORGE DYKSTRA.

CERTIFICATE OF CORRECTION.

Patent No. 1,981,840.  November 20, 1934.

HENRY HUEBER, ET AL.

It is hereby certified that error appears in the printed specification of the above numbered patent requiring correction as follows: Page 2, line 89, before "located" insert the word is: and page 3, line 144, claim 1, before "mechanism" insert the word said; and that the said Letters Patent should be read with these corrections therein that the same may conform to the record of the case in the Patent Office.

Signed and sealed this 12th day of February, A. D. 1935.

(Seal)

Leslie Frazer
Acting Commissioner of Patents.